(12) United States Patent
Perez-Ramirez

(10) Patent No.: US 10,416,282 B2
(45) Date of Patent: Sep. 17, 2019

(54) METHOD AND DEVICE FOR RADAR SIGNAL DETECTION

(71) Applicant: Intel Corporation, Santa Clara, CA (US)

(72) Inventor: Javier Perez-Ramirez, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 308 days.

(21) Appl. No.: 15/282,937

(22) Filed: Sep. 30, 2016

(65) Prior Publication Data

US 2018/0095160 A1 Apr. 5, 2018

(51) Int. Cl.
| | | |
|---|---|---|
| *G01S 7/02* | (2006.01) | |
| *H04K 3/00* | (2006.01) | |
| *H04W 16/14* | (2009.01) | |
| *G01S 7/40* | (2006.01) | |
| *H04B 1/10* | (2006.01) | |

(52) U.S. Cl.
CPC .............. *G01S 7/021* (2013.01); *H04K 3/822* (2013.01); *H04W 16/14* (2013.01); *G01S 7/023* (2013.01); *G01S 7/4021* (2013.01); *H04B 1/1027* (2013.01)

(58) Field of Classification Search
CPC . H04W 16/14; H04W 72/0453; H04W 88/06; H04W 72/082; H04W 48/16; G01S 13/931; G01S 13/426; G01S 2013/9375; G01S 7/021; G01S 7/023; G01S 13/781; G01S 13/22; G01S 7/282; G01S 7/352; G01S 7/022; H04B 2001/6912; H04B 3/822; H04B 1/1027; H01Q 3/26; H04K 3/822; H04K 3/226
See application file for complete search history.

(56) References Cited

U.S. PATENT DOCUMENTS

| | | | | |
|---|---|---|---|---|
| 6,967,615 | B1 * | 11/2005 | Lin ....................... | G01S 5/0252 342/13 |
| 7,215,276 | B2 * | 5/2007 | Batten .................... | G01S 7/022 342/13 |
| 8,112,039 | B2 * | 2/2012 | Bertagna ................. | G01S 7/021 342/20 |
| 8,179,825 | B2 * | 5/2012 | Steer ...................... | G01S 7/021 342/57 |
| 9,439,197 | B1 * | 9/2016 | Ngo ................... | H04W 72/0453 |
| 9,699,663 | B1 * | 7/2017 | Jovancevic ........... | H04W 16/14 |
| 2003/0038742 | A1 | 2/2003 | Greer | |
| 2003/0107512 | A1 | 6/2003 | McFarland et al. | |
| 2006/0199587 | A1 | 9/2006 | Hansen | |

(Continued)

OTHER PUBLICATIONS

Search Report dated Jan. 4, 2018 issued for International Application No. PCT/US2017/050487.

*Primary Examiner* — Olumide Ajibade Akonai
(74) *Attorney, Agent, or Firm* — Schiff Hardin LLP

(57) ABSTRACT

This disclosure relates to a method for radar signal detection, the method comprising: scanning a radio channel by a scanning filter in a first frequency subband to provide an incoming signal; detecting a potential radar signal in the incoming signal based on prior knowledge of a structure of the radar signal; and if the potential radar signal is detected, keeping the scanning filter in the first frequency subband; if no potential radar signal is detected, adjusting the scanning filter to a second frequency subband.

20 Claims, 12 Drawing Sheets

(56) References Cited

U.S. PATENT DOCUMENTS

| | | | |
|---|---|---|---|
| 2009/0061780 A1* | 3/2009 | Sekiya | G01S 7/021 |
| | | | 455/63.1 |
| 2009/0160696 A1 | 6/2009 | Pare et al. | |
| 2011/0150053 A1 | 6/2011 | Kim | |
| 2013/0314267 A1 | 11/2013 | Kenney et al. | |
| 2014/0253361 A1* | 9/2014 | Rezk | G01S 7/021 |
| | | | 342/16 |
| 2014/0254346 A1* | 9/2014 | Rezk | G01S 7/021 |
| | | | 370/210 |
| 2014/0328286 A1 | 11/2014 | Crowle et al. | |
| 2016/0073403 A1* | 3/2016 | Kloper | H04L 1/00 |
| | | | 370/329 |
| 2016/0103204 A1* | 4/2016 | Valentine | G01S 7/022 |
| | | | 342/20 |
| 2016/0291130 A1* | 10/2016 | Ginsburg | G01S 7/352 |
| 2017/0041949 A1* | 2/2017 | Ngo | H04W 16/14 |
| 2017/0070993 A1* | 3/2017 | Ngo | H04W 16/14 |

* cited by examiner

METHOD AND DEVICE FOR RADAR SIGNAL DETECTION

FIELD

The disclosure relates to a method and a device for radar signal detection, in particular detection of radar signals in Unlicensed National Information Infrastructure (U-NII) frequency bands. The disclosure further relates to an adaptive scanning algorithm for low power radar detection (LPRD) in the 5 GHz DFS (Dynamic Frequency Selection) band.

BACKGROUND

FIG. 1a shows a wireless communication system 100a in which communication 111 between a base station 110 and a mobile device 130 is superimposed by a radar signal 121 from a radar station 120. FIG. 1b shows a wireless communication system 100b in which communication between two power constrained mobile devices 130, 131 in the 5 GHz DFS band 122 without involving a base station/access point is superimposed by a radar signal 121 from a radar station 120. To operate mobile communication devices 130, 131 in the Unlicensed-National Information Infrastructure (U-NII) bands 5250 MHz to 5350 MHz and/or 5470 MHz to 5725 MHz, U-NII devices 130, 131 must be able to detect radar signals 121 prior and during operation in these bands. Dynamic frequency selection (DFS) techniques are used to avoid co-channel interference between U-NII devices 130, 131 and radar signals 121. In the USA, Federal Communications Commission standard FCC 06-96 describes the compliance procedures to operate U-NII devices 130 in the U-NII bands. To fulfill these compliance procedures, especially in dense communication scenarios and/or for power constrained mobile devices, there is a need to improve the probability of radar detection and at the same time to decrease the probability of false detection, in particular by applying a low power radar detection scheme.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

Figure 1A:
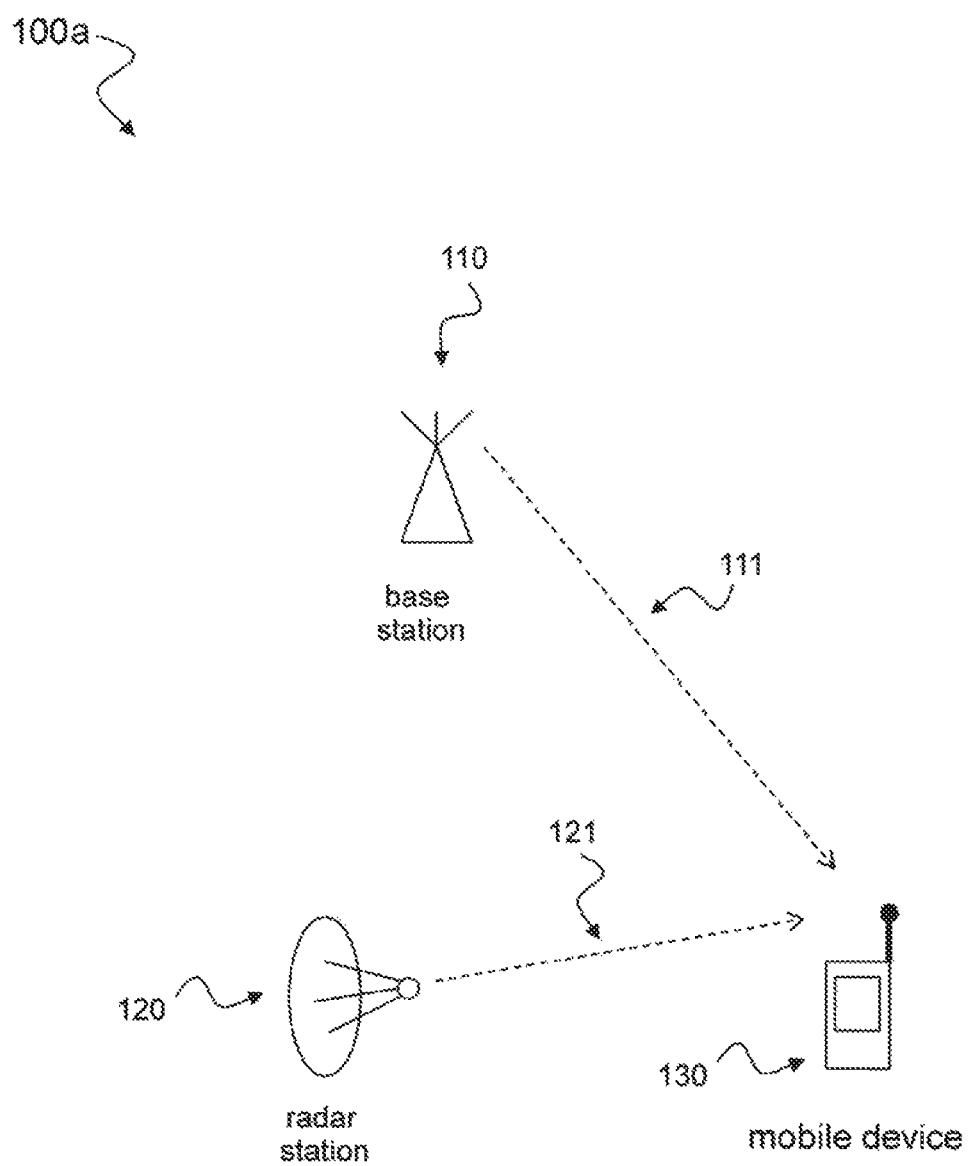
FIG. 1a is a schematic diagram illustrating a wireless communication system 100a between a base station 110 and a mobile device 130 in which mobile communication and radar communication coexist.
Figure 1B:
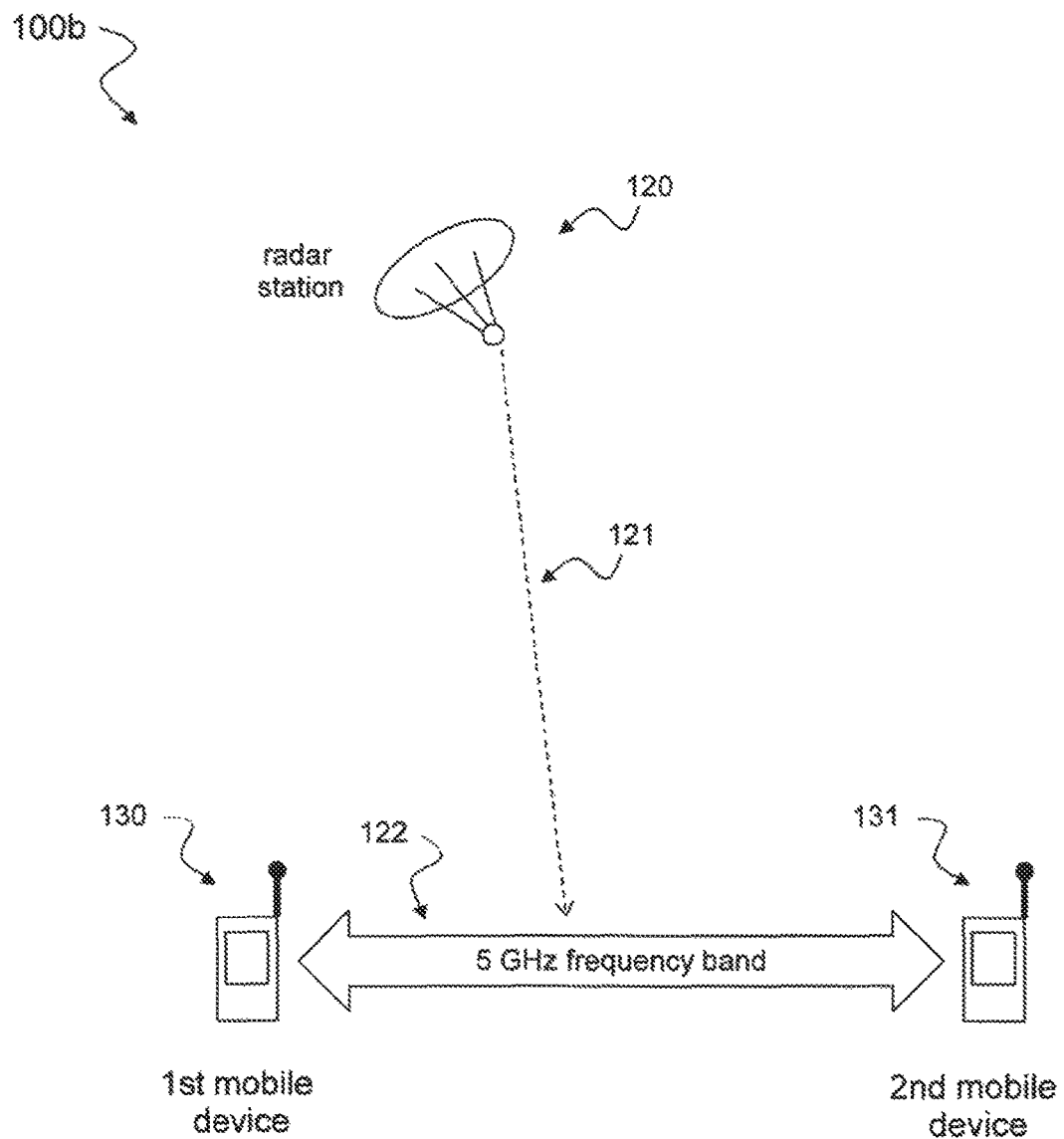
FIG. 1b is a schematic diagram illustrating a wireless communication system 100b between two power constrained mobile devices 130, 131 in which mobile communication and radar communication coexist.

In the following detailed description, reference is made to the accompanying drawings, which form a part thereof, and in which is shown by way of illustration specific aspects in which the invention may be practiced. It is understood that other aspects may be utilized and structural or logical changes may be made without departing from the scope of the present invention. The following detailed description, therefore, is not to be taken in a limiting sense, and the scope of the present invention is defined by the appended claims.

The following terms, abbreviations and notations will be used herein:
U-NII: Unlicensed National Information Infrastructure
LPRD: low power radar detection
DFS: Dynamic Frequency Selection
FCC: Federal Communications Commission
PW: pulse width
PRI: pulse repetition interval
LPF: low pass filter
X4: four times amplification
A/D: analog to digital converter
PLL: phase locked loop
BW: bandwidth The methods and devices described herein may be used for detecting radar signals before or during wireless communication of mobile devices, user equipments (UE), mobile terminals or U-NII devices. A U-NII device is a mobile or wireless device that may operate in the U-NII bands, i.e. 5250 MHz to 5350 MHz and/or 5470 MHz to 5725 MHz. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on high speed communication standards from the 802.11 family according to the WiFi alliance, e.g. 802.11ad and successor standards. The methods are also applicable for mobile communication standards such as LTE, in particular LTE-A and/or OFDM and successor standards such as 5G. The methods and devices described below may be implemented in electronic devices such as mobile or wireless devices (or mobile stations or User Equipments (UE) or U-NII devices), in particular in radio receivers of such devices. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals and performing associated signal processing. Radio signals may be or may include radio frequency signals radiated by a radio transmitting device (or radio transmitter or sender) with a radio frequency lying in a range of about 3 kHz to 300 GHz. The frequency range may correspond to frequencies of alternating current electrical signals used to produce and detect radio waves.

Figure 2:
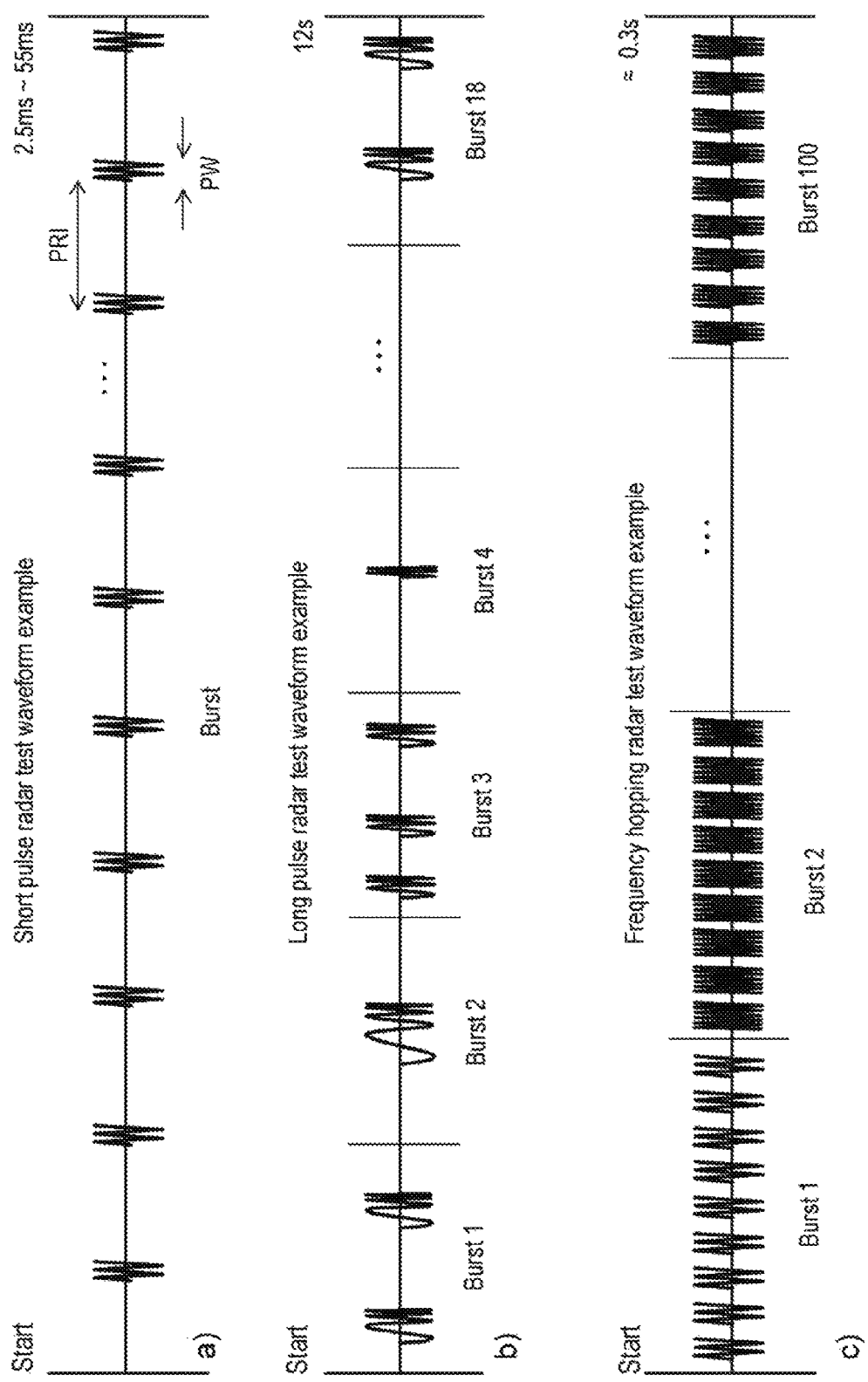
FIGS. 2a, 2b and 2c are time diagrams illustrating different test waveforms according to FCC 06-96.

The methods and devices described herein may be configured to receive radar signals emitted from radar devices or radar systems. A radar system uses a radio frequency electromagnetic signal reflected from a target to determine information about that target. The carrier is an RF signal, typically of microwave frequencies, which is usually modulated to allow the system to capture the required data. In some radar systems, the carrier is pulse modulated, i.e. the carrier can be simply switched on and off in sync with the pulses. In the receiver, the envelope of the pulse waveform can be extracted from the demodulated carrier. The pulse width (PW) of the transmitted signal is to ensure that the radar emits sufficient energy to allow that the reflected pulse is detectable by its receiver. The amount of energy that can be delivered to a distant target is the product of the output power of the transmitter and the duration of the transmission. Most radar systems emit pulses continuously and the repetition rate of these pulses or the pulse repetition interval (PRI) allows the receiver to receive a discernible echo. The Federal Communications Commission standard FCC 06-96 describes different types of radar signals for operation of U-NII devices in the 5 GHz DFS band. Radar signals specified by FCC 06-96 are divided into short pulse radar test waveforms (e.g. as shown in FIG. 2a), long pulse radar test waveforms (e.g. as shown in FIG. 2b) and frequency hopping radar test waveforms (e.g. as shown in FIG. 2c). Each radar signal is defined by its pulse width (PW), pulse repetition interval (PRI), number of pulses per burst, chirp bandwidth and carrier frequency. FIG. 2 shows an example of different radar signals.

The disclosure described herein after provides a low-power radar detection mechanism that can be applied to Wi-Fi solutions operating, e.g. in the 5 GHz DFS band and enables wideband high-throughput operation in the band in an energy efficient way.

In the following, embodiments are described with reference to the drawings, wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense.

The various aspects summarized may be embodied in various forms. The following description shows by way of illustration various combinations and configurations in which the aspects may be practiced. It is understood that the described aspects and/or embodiments are merely examples, and that other aspects and/or embodiments may be utilized and structural and functional modifications may be made without departing from the scope of the present disclosure.

Figure 3:
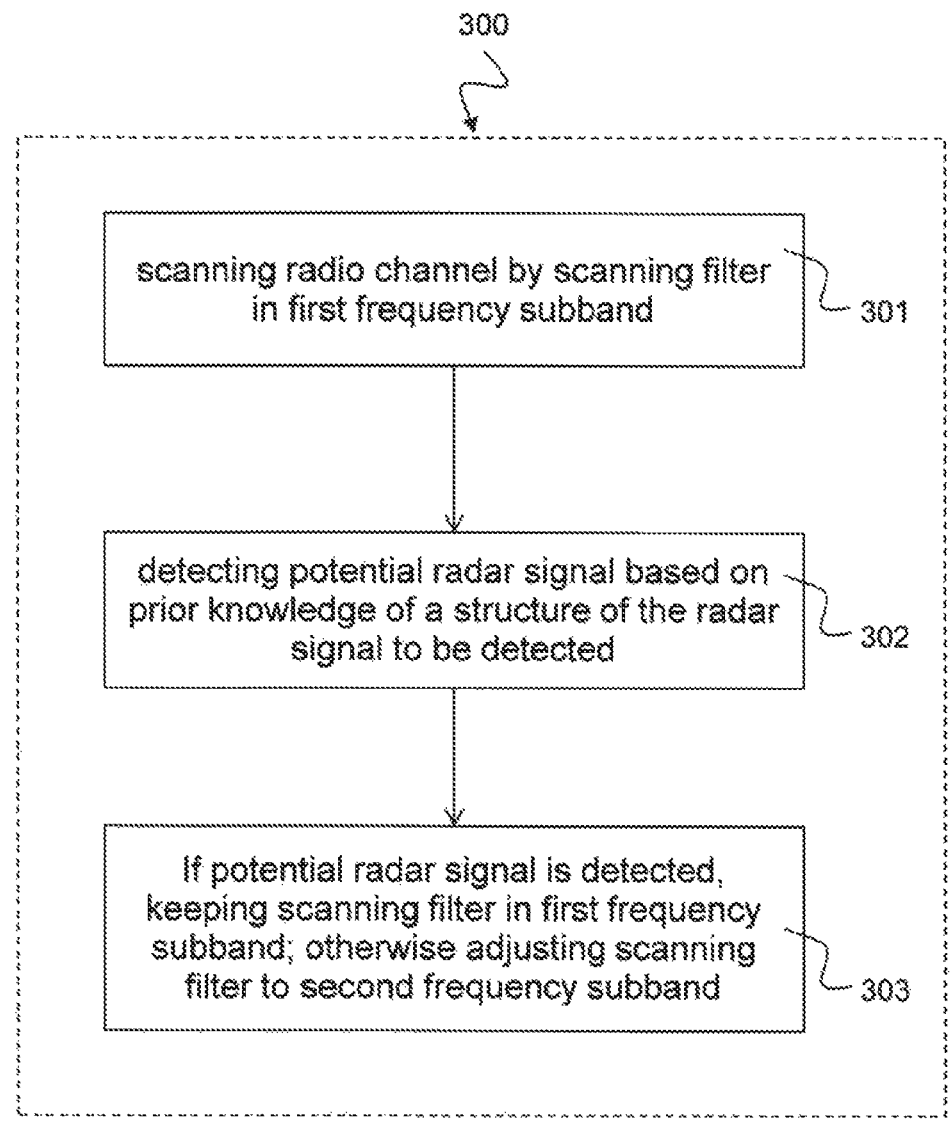
FIG. 3 is a schematic diagram illustrating a method 300 for radar signal detection according to the disclosure.

FIG. 3 is a schematic diagram illustrating a method 300 for radar signal detection according to the disclosure.

The method 300 includes scanning 301 a radio channel by a scanning filter in a first frequency subband to provide an incoming signal, e.g. as described below with respect to FIGS. 5 to 7 and illustrated by the examples of FIGS. 8 to 11. The method 300 further includes detecting 302 a potential radar signal in the incoming signal based on prior knowledge of a structure of the radar signal, e.g. prior knowledge as described below. The method 300 further includes: if the potential radar signal is detected 303, keeping the scanning filter in the first frequency subband, if no potential radar signal is detected, adjusting the scanning filter to a second frequency subband, e.g. as described below with respect to FIGS. 5 to 7 and illustrated by the examples of FIGS. 8 to 11.

The structure of the radar signal may be according to the specifications of the Federal Communications Commission (FCC) dynamic frequency selection (DFS) standard FCC 06-96. For example, the radar signal may be from the category of short pulse radar test waveforms according to the definition of FCC 06-96, e.g. as depicted in the example of FIG. 2a. The radar signal may be from one of four types of short pulse radar test waveforms as defined in FCC 06-96. The radar signal may have a constant pulse width (PW) and pulse repetition interval (PRI) per burst, e.g. as shown in the example of FIG. 2a. The pulse width may be in a range from 1 microseconds to 20 microseconds and the pulse repetition interval may be in a range from 150 microseconds to 3066 microseconds.

The method 300 may include passing the incoming signal through an envelope detector to provide an envelope signal. An integration time of the envelope detector may be adjusted based on a type of radar signal. The method 300 may further include: applying a threshold to the envelope signal to provide a threshold signal. The threshold may be based on the type of radar signal. The method 300 may further include: providing a detection decision and an estimate of a pulse repetition interval of the radar signal based on the threshold signal. The detection decision and the estimate of the pulse repetition interval may be based on the type of radar signal.

The method 300 may further include: providing the detection decision and the estimate of the pulse repetition interval for each type of radar signal. If the detection decision indicates a presence of a potential radar signal, the method may include determining a scanning time interval for keeping the scanning filter in the first frequency subband. The scanning time interval may be based on a maximum decision with respect to pulse repetition intervals of each type of radar signal. The scanning time interval may further be based on a bandwidth of the scanning filter, a bandwidth of the radio channel and a scanning period, as illustrated below in FIGS. 9 and 11.

Figure 4:
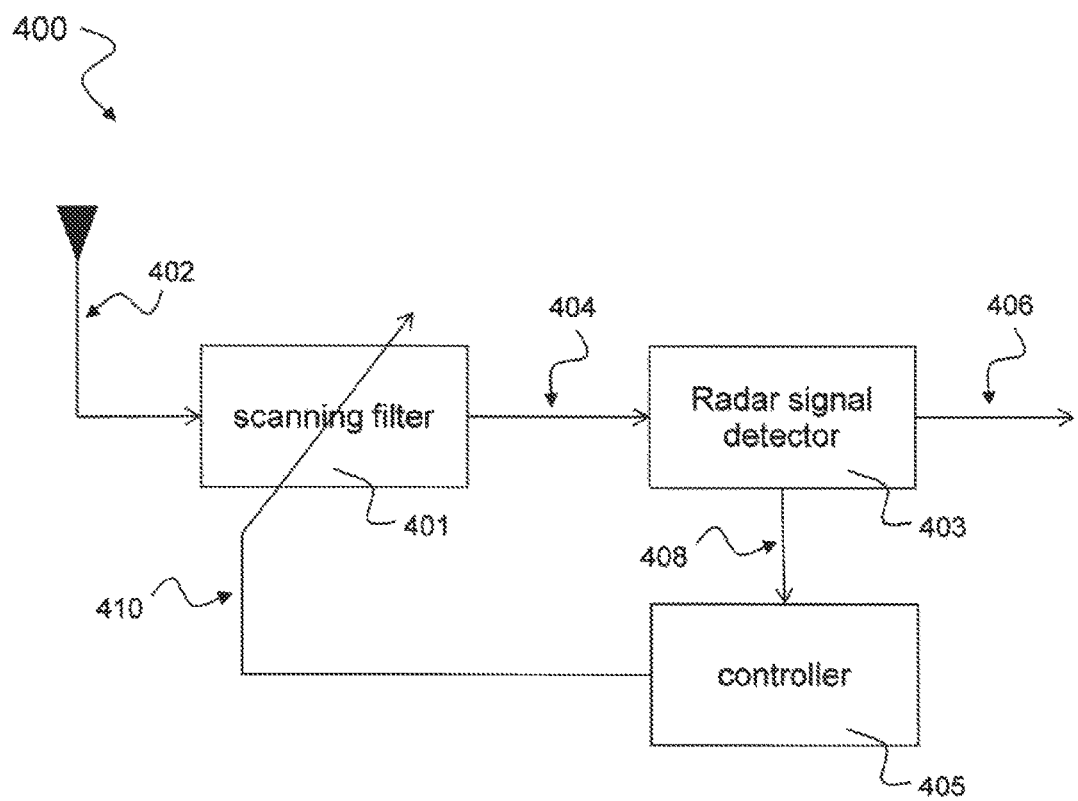
FIG. 4 is a block diagram illustrating a radar signal detection device 400 according to the disclosure.

FIG. 4 is a block diagram illustrating a radar signal detection device 400 according to the disclosure. The radar signal detection device 400 includes a scanning filter 401, a radar signal detector 403 and a controller 405.

The scanning filter 401 is configured to scan a radio channel 402 in an adjustable frequency range to provide an incoming signal 404. The radar signal detector 403 configured to detect a potential radar signal 406 in the incoming signal 404 and to determine a pulse repetition interval (PRI)

408 of the potential radar signal based on prior knowledge of a structure of the radar signal. The controller 405 is configured to adjust the frequency range 410 of the scanning filter 401 based on the determined PRI 408 of the potential radar signal.

Figure 6:
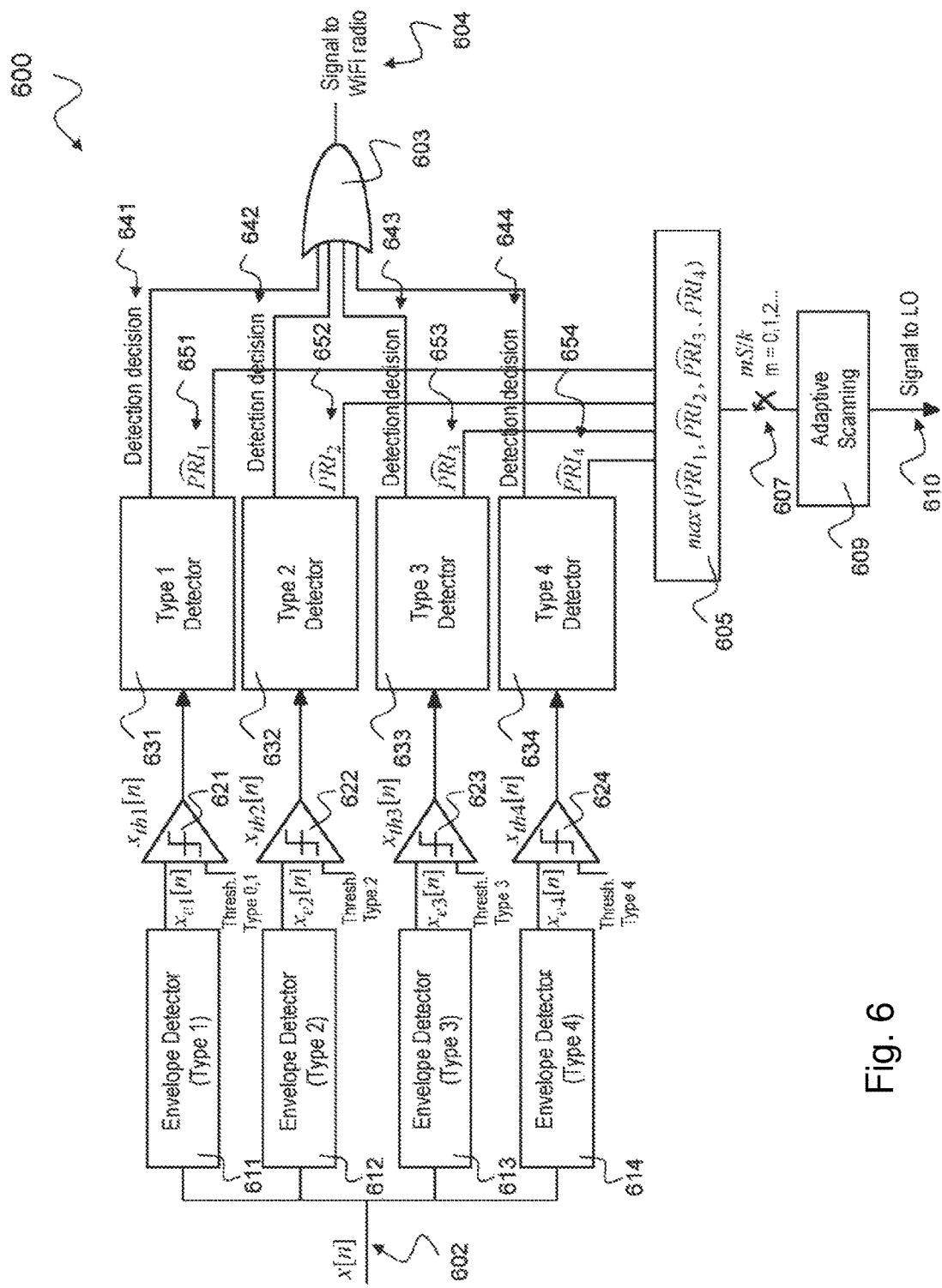
FIG. 6 is a block diagram illustrating a controller 600 implementing an LPRD algorithm according to the disclosure.

In one implementation, the radar signal detection device 400 may include a plurality of envelope detectors, e.g. blocks 611, 612, 613, 614 as shown in FIG. 6, each one associated to a specific type of radar signal. Each envelope detector may be configured to provide a respective envelope signal based on integration of the incoming signal 404 using an integration time adjusted based on the specific type of radar signal. The radar signal detector 403 may include a plurality of type detectors, e.g. blocks 631, 632, 633, 634 as shown in FIG. 6, each type detector configured to provide a detection decision, e.g. signals 641, 642, 643, 644 as shown in FIG. 6, and a PRI, e.g. signals 651, 652, 653, 654 as shown in FIG. 6, for the specific type of radar signal. The controller 405 may be configured to adjust the frequency range 410 of the scanning filter 401 based on a maximum decision with respect to the PRIs determined by the type detectors, e.g. by using a block 605 as shown in FIG. 6.

Figure 7:
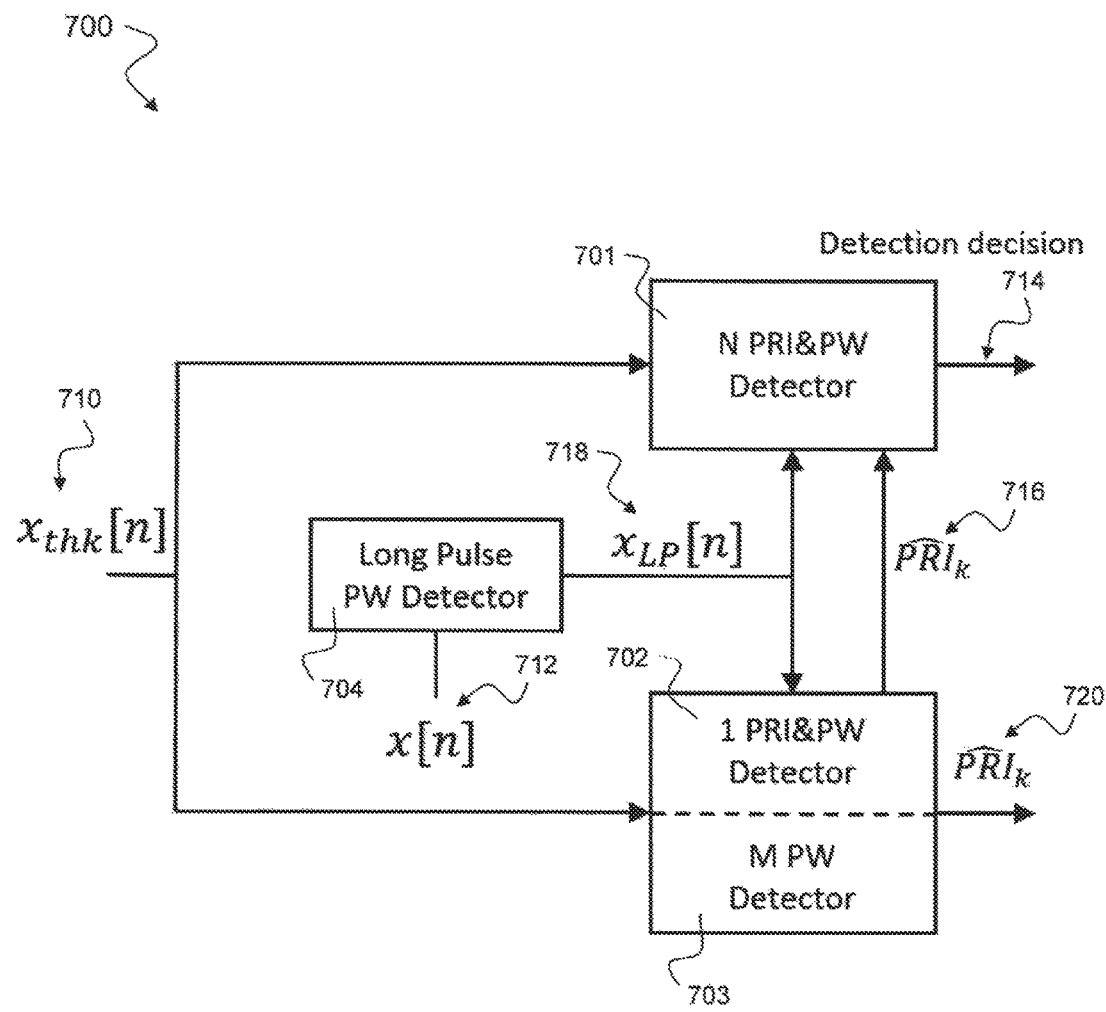
FIG. 7 is a block diagram illustrating a radar signal detector 700 for detecting a type k radar signal according to the disclosure.

In one implementation of the radar signal detection device 400, each type detector may include a first detector, e.g. a 1 PRI&PW detector 702 as shown in FIG. 7, configured to detect a presence of two short pulses which are pulses having a pulse width (PW) below a predefined PW, e.g. short pulses as defined by FCC 06-96. Each type detector may further include a second detector, e.g. a M PW detector 703 as shown in FIG. 7, configured to detect a presence of a first plurality of consecutive pulses with the same PW. Each type detector may further include a third detector, e.g. a N PRI&PW detector 701 as shown in FIG. 7, configured to detect a presence of a second plurality of consecutive short pulses with the same PW and the same PRI. Each type detector may further include a fourth detector, e.g. a long pulse PW detector 704 as shown in FIG. 7, configured to detect a presence of long pulses which are pulses having a PW above the predefined PW, e.g. long pulses as defined by FCC 06-96.

The fourth detector may provide the detection decision based on detection results of the first detector, the second detector and the third detector, e.g. as described below with respect to FIG. 7.

Figure 5:
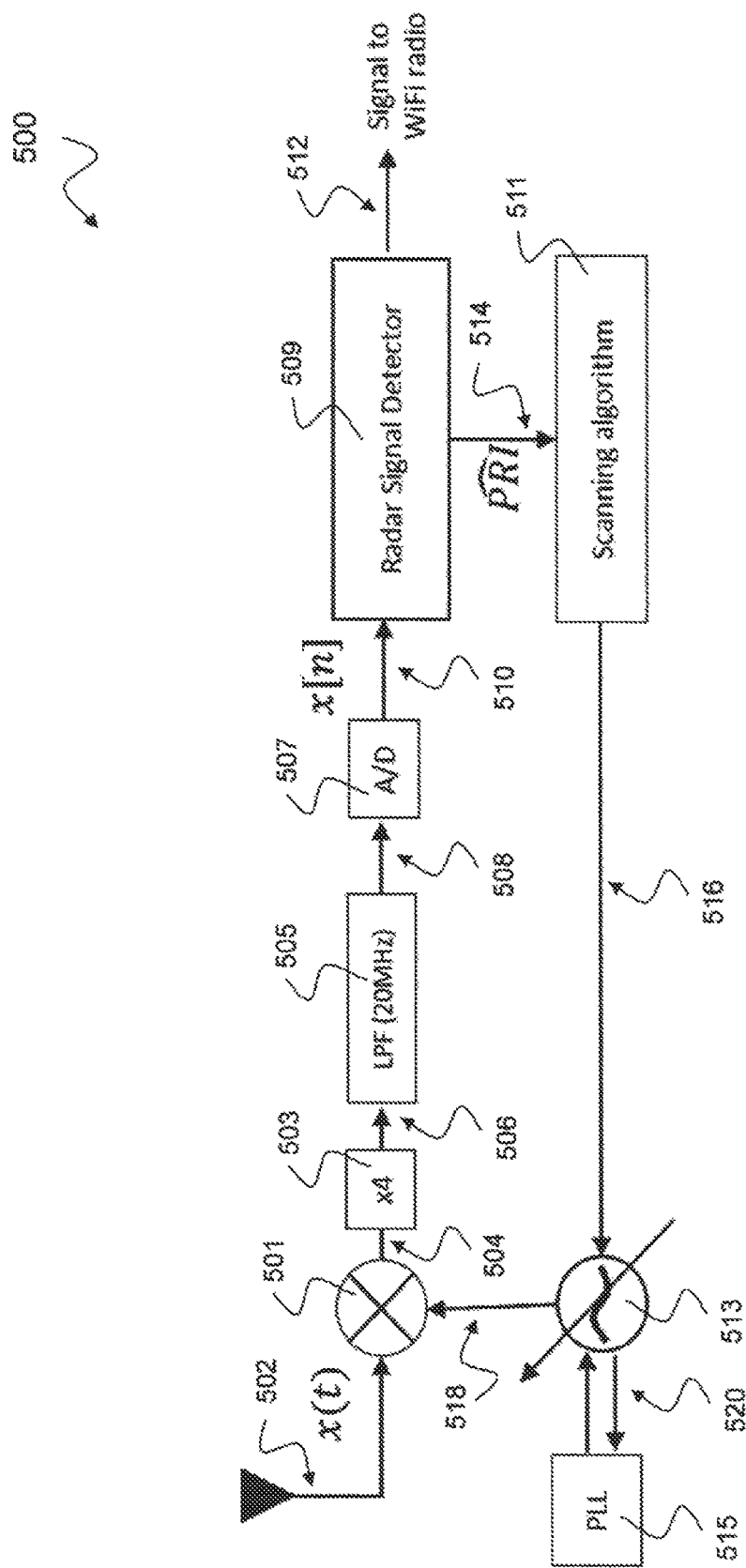
FIG. 5 is a block diagram illustrating the architecture of a Low Power Radar Detection (LPDR) receiver 500 according to the disclosure.

FIG. 5 is a block diagram illustrating the architecture of a Low Power Radar Detection (LPDR) receiver 500 according to the disclosure.

The LPDR receiver 500 includes a scanning filter 505, e.g. according to block 401 of FIG. 4, a radar signal detector 509, e.g. according to block 403 of FIG. 4 and a scanning algorithm 511, e.g. implemented in a controller 405 as described below with respect to FIG. 4.

The scanning filter 505 is configured to scan a radio channel 502 in an adjustable frequency range to provide an incoming signal 510. The radar signal detector 509 is configured to detect a potential radar signal 512 in the incoming signal 510 and to determine a pulse repetition interval (PRI) 514 of the potential radar signal based on prior knowledge of a structure of the radar signal. The controller implementing the scanning algorithm 511 is configured to adjust the frequency range of the scanning filter 505 based on the determined PRI 514 of the potential radar signal. For such adjustment a local oscillator 513 controlled 520 by a PLL 515 can be adjusted 516 by the scanning algorithm 511 to provide a control signal 518 for a mixer 501 to apply to the received radio signal 502 from antenna. The mixer output signal 504 may be amplified by an amplifier 503, e.g. by using four times amplification to provide the input signal 506 for the scanning filter 505.

In this radio receiver 500, a low power narrow band filter 505 with bandwidth $BW_s$ sequentially scans the operating band (of the radio channel), sweeping the operating channel bandwidth $BW_o$ periodically every S seconds to determine the presence of radar signals. After analog-to-digital conversion 507, envelope detection is performed by the radar signal detector 509. To detect the radar signal, various detection algorithms as described below can be used based on the presence of consecutive pulses with same PW and PRI. To achieve the detection rates specified in FCC 06-96, an adaptive scanning algorithm 511 as described below can be used. This technique allows the scanning filter 505 to remain in the current frequency sub-band when a potential radar signal is detected. Staying longer allows the detector 509 to make a better decision by gathering more information about the received signal. Radar detection is performed based upon the presence of consecutive pulses with same pulse width (PW) and pulse repetition interval (PRI), e.g. short pulse radar test waveforms as defined by FCC 06-96.

The radar signal detector 509 applies an improved LPRD algorithm for short pulse radar test signal detection. The algorithm uses prior knowledge of the structure of the radar signals described in FCC 06-96. This knowledge helps the adaptive scanning algorithm 511 to find the frequency sub-band in which the radar signal is located to facilitate the detection.

Short pulse radar test waveforms are described in the FCC 06-96 as signals formed by consecutive pulses with same PW and PRI. Typical pulse widths in these signals range from 1 us to 20 us, with PRI oscillating from 150 us up to 3066 us. Detection of radar signals can be triggered by taking advantage of the prior knowledge of the structure of these signals, i.e., constant PW and PRI per burst. In this receiver 500, the narrow band low pass filter 505 scans the operational channel to find the incoming radar signal. The radar signal detector 509 uses a novel approach to determine the presence of a potential radar signal. Also, new rules are defined below with respect to FIGS. 6 and 7 to determine how long the radar signal detector 509 has time to detect a potential radar signal before the adaptive scanning filter 505 moves to the next frequency sub-band.

FIG. 6 is a block diagram illustrating a controller 600 implementing an LPRD algorithm according to the disclosure.

The controller 600 includes a plurality of envelope detectors, in particular a number of four such envelope detectors 611, 612, 613, 614, each one receiving the incoming signal x[n] 602 that may correspond to the incoming signal x[n] 510 depicted in FIG. 5. A corresponding plurality of comparators, in particular a number of four such comparators 621, 622, 623, 624 are coupled to the outputs of the envelope detectors, each one providing a respective threshold signal $x_{th1}[k]$, $x_{th2}[k]$, $x_{th3}[k]$, $x_{th4}[k]$ based on applying a respective threshold to the output signals of the envelope detectors. The first threshold may be adjusted to detect a type 0 or 1 radar waveform signal as defined in FCC 06-96, the second threshold may be adjusted to detect a type 2 radar waveform signal as defined in FCC 06-96, the third threshold may be adjusted to detect a type 3 radar waveform signal as defined in FCC 06-96 and the fourth threshold may be adjusted to detect a type 4 radar waveform signal as defined in FCC 06-96. The threshold signals of the different comparators are passed to corresponding type detectors 631, 632, 633, 634 which are configured to detect the presence of a potential radar signal in the incoming signal 602 according to the type of radar signal.

Type 1 detector 631 may be configured to detect a potential type 0 or 1 radar waveform signal; Type 2 detector 632 may be configured to detect a potential type 2 radar waveform signal; Type 3 detector 633 may be configured to detect a potential type 3 radar waveform signal and Type 4 detector 634 may be configured to detect a potential type 4 radar waveform signal. The type detectors provide respective detections decisions 641, 642, 643, 644 and respective estimates for pulse repetition interval PRI 651, 652, 653, 654 which are used by a maximum detector 605 to detect a maximum PRI. A switch 607 is used to switch between the time frequency resources according to relation mS/k for m=1, 2, . . . , e.g. as described below with respect to FIGS. 8-11. An adaptive scanning block 609 that may correspond to the scanning algorithm 511 of FIG. 5 is used to provide a signal to local oscillator 610 that may correspond to the control signal 516 described above with respect to FIG. 5. The detection decisions 641, 642, 643, 644 are combined by a combination logic 603, e.g. an EXOR, to provide a signal to WiFi radio 604 indicating a presence of a radar signal in the incoming signal x[n] 602.

In the following an example for an LPRD algorithm is described.

1. Received signal x[n] 602 from the ADC 507 (see FIG. 5) is passed through an envelope detector 611, 612, 613, 614. Envelope detector integration time is adjusted depending on radar signal type to improve pulse shape.

2. The envelope signal $x_{ek}[n]$, k=1, . . . , 4 is thresholded by comparator 621, 622, 623, 624 to estimate radar signal PW and PRI. Threshold level is selected to maximize the probability radar detection and reduce the probability of false detection.

3. The thresholded signal $x_{thk}[n]$ is passed through the radar signal detector (type k detector 631, 632, 633, 634). The radar signal detector 631, 632, 633, 634 is divided into multiple modules as described below with respect to FIG. 7.

4. Finally, before the scanning filter moves to the next frequency sub-band, if the radar signal detector 631, 632, 633, 634 detects the potential presence of a radar signal, the scanning filter remains in the current frequency sub-band for the next $\text{ceil}(\max(\overline{PR}\,I_1, \overline{PRI_2}\,I_2, \overline{PR}\,I_3, \overline{PR}\,I_4)/(S/k))\cdot S/q$ seconds, where ceil(•) is the ceiling operator, S is the narrow band scanning period, $BW_o$ is the operational channel bandwidth, $BW_s$ is the narrow band scanning filter bandwidth and $q=BW_o/BW_s$.

FIG. 7 is a block diagram illustrating a radar signal detector 700 for detecting a type k radar signal according to the disclosure. The radar signal detector 700 may correspond to each one of the type k detectors 631, 632, 633, 634 described above with respect to FIG. 6.

The radar signal detector 700 includes a first detector (1 PRI&PW) 702, a second detector (M PW) 703, a third detector (N PRI&PW) 701 and an optional fourth detector (Long Pulse PW detector) 704.

The first detector (1 PRI&PW) 702 is configured to detect two pulses of the same pulse width (PW) based on a threshold signal and to estimate a pulse repetition interval (PRI) of the detected pulses. The second detector (M PW) 703 is configured to detect a plurality of consecutive pulses of the same PW based on the threshold signal and to estimate a PRI of the detected pulses. The third detector (N PRI&PW) 701 is configured to detect a plurality of consecutive pulses of the same PW and the same PRI based on the threshold signal.

The third detector 701 may further be configured to predict an arrival of new pulses based on the PRIs estimated by the first detector and the second detector.

The fourth detector 704 is configured to detect a presence of long pulses which are pulses having a PW above a predefined PW, e.g. according to the definition of long pulse test waveforms of FCC 06-96.

The third detector 701 may further be configured to detect an overlap of the plurality of pulses detected by the third detector with the long pulses, and to trigger a radar signal detection decision if the plurality of pulses detected by the third detector are detected without an overlap with the long pulses, e.g. as described in the following.

The radar signal detector 700 depicted in FIG. 7 is divided into multiple modules, which are the first detector (1 PRI&PW) 702, the second detector (M PW) 703, the third detector (N PRI&PW) 701 and the fourth detector (Long Pulse PW detector) 704.

The long pulse detector 704 determines if the incoming radar pulses are short (1 us to 20 us) or long (>20 us) and informs the rest of the modules. It is typically formed by an envelope detector with long integration time (~70 us), and a comparator that thresholds the signal to estimate the PW. The output of this module is the Boolean signal $x_{LP}[n]$ with entries equal to zero when no pulses are detected and entries equal to one when the detected pulses are long. Long pulses could be potentially generated by chirped radar signals (type 5) or Wi-Fi signals (co-channel interference).

The 1 PRI&PW detector 702 detects the presence of two short pulse radar signals with same PW and legal PRI. The estimated PRI is passed to the scanning algorithm and the N PRI&PW detector 701. Long pulses detected by the long pulse PW detector are not considered.

The M PW detector 703 finds M consecutive pulses with same pulse width but illegal PRI. Pulses are only counted if they are detected in the same frequency sub-band. Based on the estimated PW, the received radar signal type is estimated. Long pulses detected by the long pulse PW detector are not considered. If M consecutive pulses are detected, the module sets the estimated PRI to be the maximum allowed PRI specified in the FCC 06-96 for the estimated signal type. If both 1 PRI&PW detector and M PW detector are triggered, the minimum estimated PRI is sent to the adaptive scanning algorithm and the N PRI&PW detector 701.

The N PRI&PW detector finds N consecutive short pulses with same PW and PRI. This module also predicts the arrival of new pulses based on the PRI estimate sent by the other modules. Long pulses detected by the long PW detector are considered to determine overlap between the predicted arrival of the next short pulse and long pulses. If the overlap exists, the detector moves on and tries to find the next pulse using the estimated PRI. This operation is repeated until N pulses free of long pulse interference are detected. Detection is triggered if N pulses with same PW are detected and their arrival time is as predicted by the estimated PRI.

Before the scanning filter moves to the next frequency sub-band, if the 1PRI&PW detection module 702 or the M PW detection module 703 detects the potential presence of a radar signal, the scanning filter remains in the current frequency sub-band for the next scanning iteration as described above with respect to FIG. 6.

Figure 8:
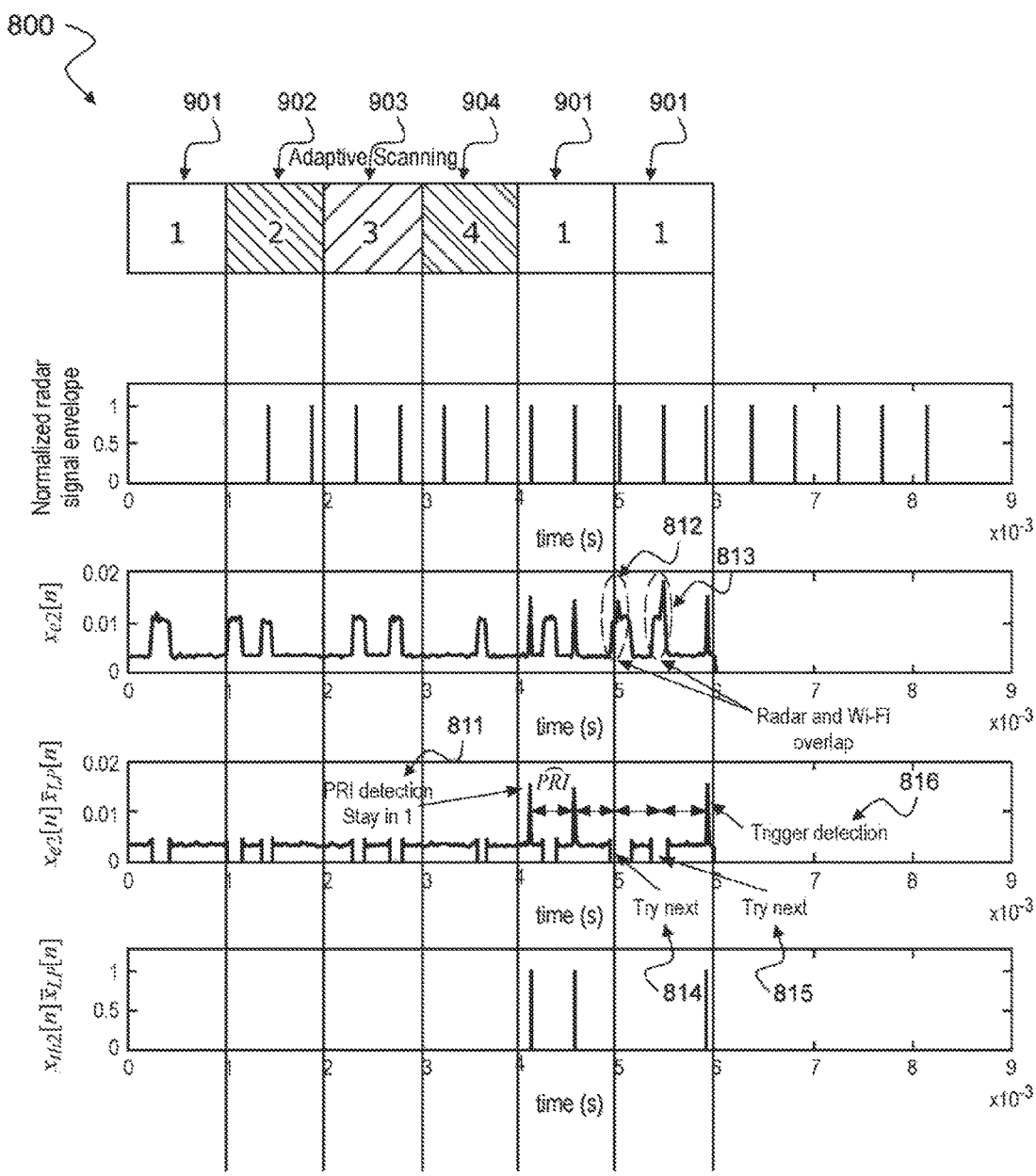
FIG. 8 is a schematic diagram 800 illustrating an operation example of the N PRI&PW module of FIG. 7 when using N=3.
Figure 9:
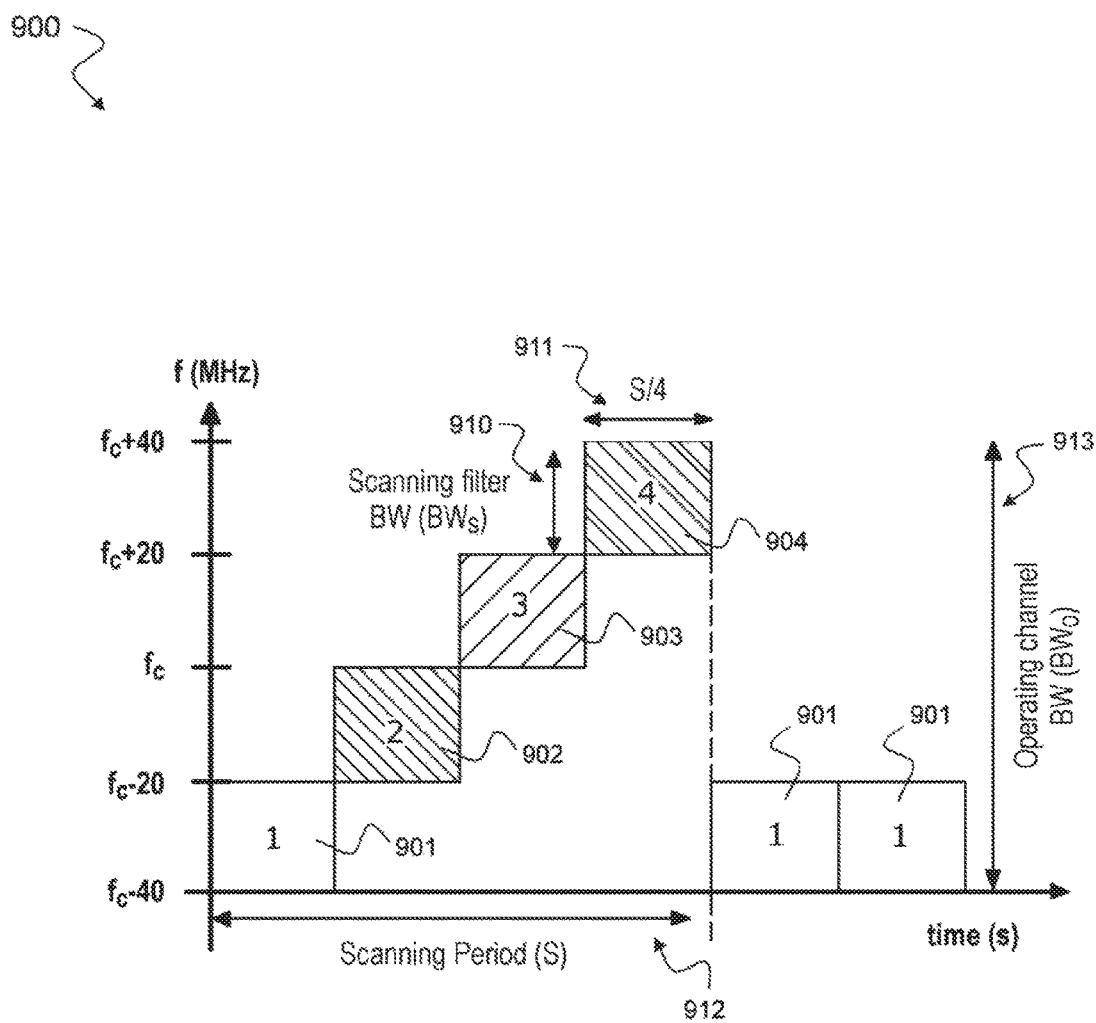
FIG. 9 is a time-frequency diagram 900 illustrating scanning filter adjustment for the example of FIG. 8.

FIG. 8 is a schematic diagram 800 illustrating an operation example of the N PRI&PW module of FIG. 7 when using N=3 and FIG. 9 is the corresponding time-frequency diagram 900 illustrating scanning filter adjustment for the example of FIG. 8.

Both Figures show how the radar signal detector 509, 600 described above with respect to FIGS. 5 to 7 operates. In this example a type 2 radar signal is considered with carrier frequency $f_c$—30 MHz, where $f_c$ is the operating channel central frequency. Wideband (80 MHz) co-channel interference is generated in the 80 MHz operating channel. As can be seen from FIG. 8, the scanning filter is able to detect two radar pulses arriving in between 4 and 5 ms. It can also be seen from FIG. 8 that the the long pulse detector module 704 finds and removes long pulses from the detection process. Using these two pulses, the 1PRI&PW detection module 702 finds an estimate of the PRI 811 and this estimate is sent to the N PRI&PW detector 701 and the scanning algorithm, where the decision to stay in the current frequency band is made. After the first two detected pulses, one can observe that the following two pulses 812, 813 are overlapped with long pulses and thus excluded from the detection process. However, the N PRI&PW 701 carries on 814, 815 until the fifth pulse arrives, which is detected at the predicted time instant (first pulse arrival time+4 PRI) and detection is triggered 816 (N=3).

FIG. 9 illustrates the 80 MHz operating channel (radio channel) in which an exemplary number of four subbands are scanned by the scanning filter. S is the narrow band scanning period 912, $BW_o$ is the operational channel bandwidth 913, $BW_s$ is the narrow band scanning filter bandwidth 910. In this example, a first subband 901 ranges from fc−40 MHz to fc−20 MHz, a second subband 902 ranges from fc−20 MHz to fc MHz, a third subband 903 ranges from fc MHz to fc+20 MHz and a fourth subband 904 ranges from fc+20 MHz to fc+40 MHz. The scanning period 912 is divided into four intervals 911, each one is a fourth of the scanning period 912.

Figure 10:
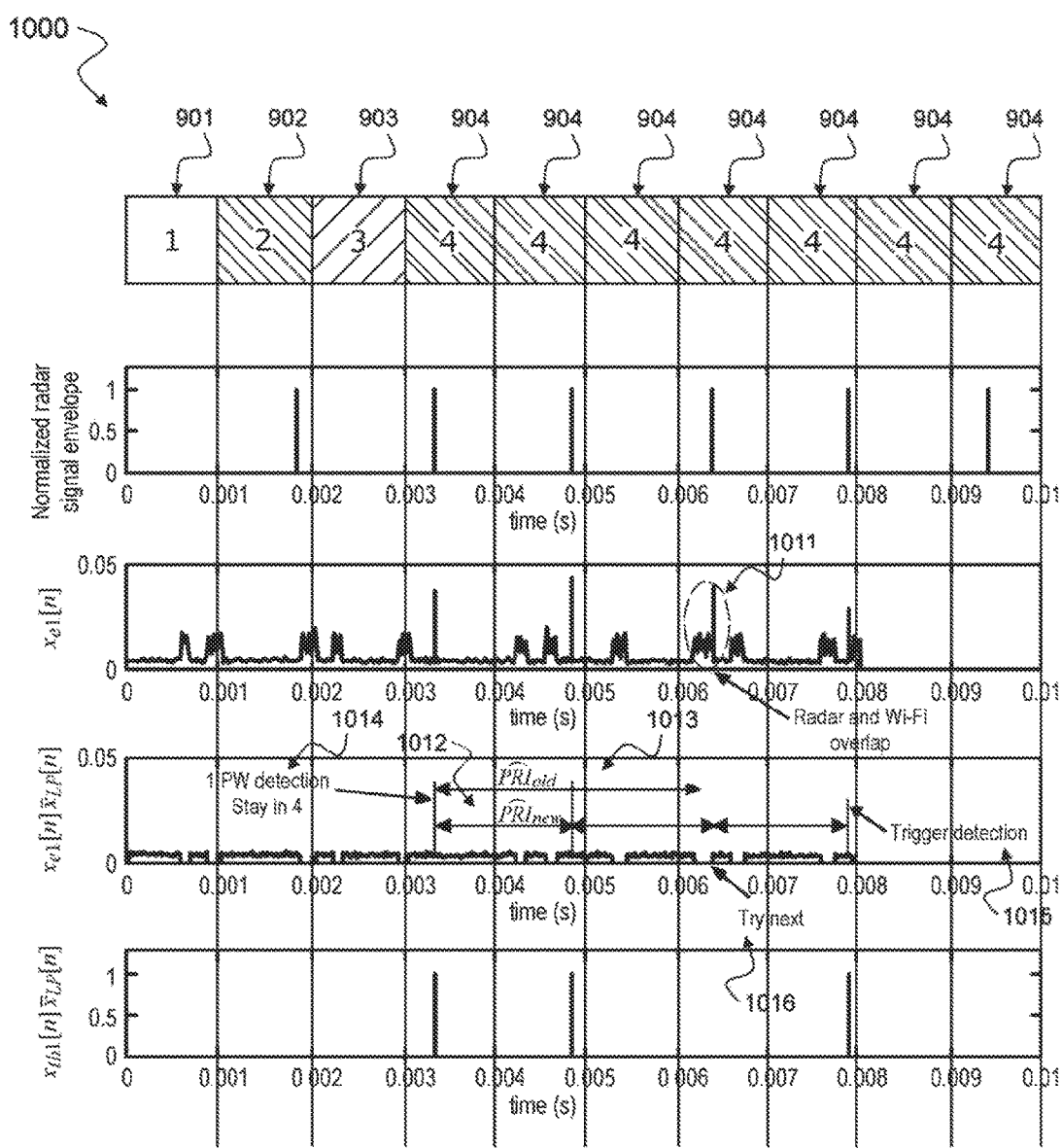
FIG. 10 is a schematic diagram 1000 illustrating an example of combined operation of the M PW module and the N PRI&PW module of FIG. 7 when using M=1 and N=3.
Figure 11:
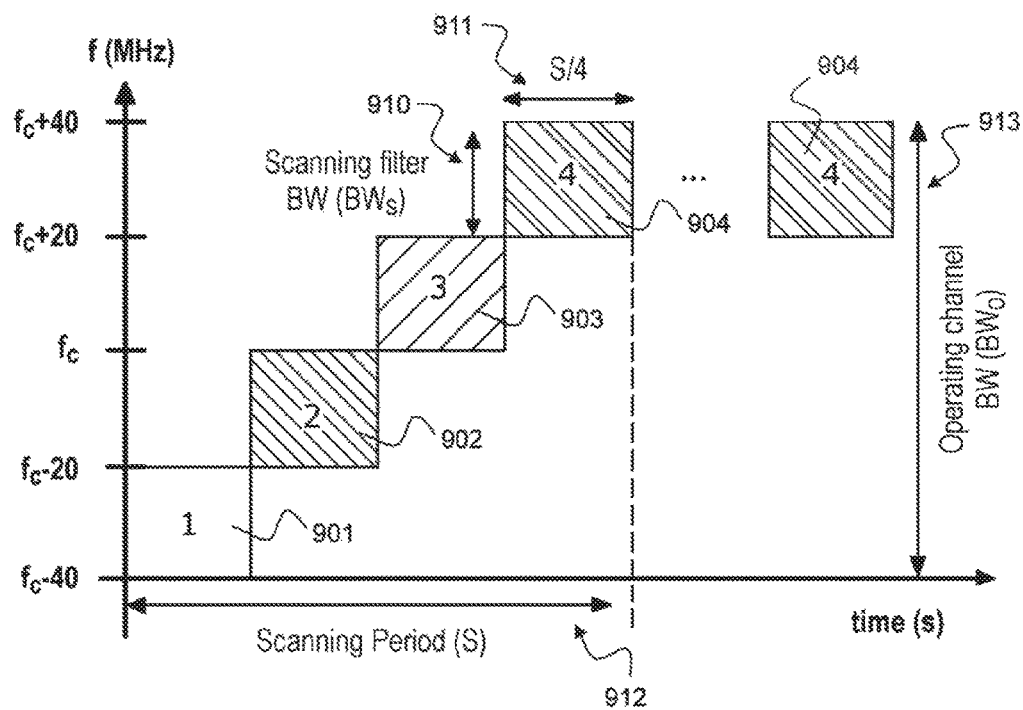
FIG. 11 is a time-frequency diagram 1100 illustrating scanning filter adjustment for the example of FIG. 10.

FIG. 10 is a schematic diagram 1000 illustrating an example of combined operation of the M PW module and the N PRI&PW module of FIG. 7 when using M=1 and N=3 and FIG. 11 is the corresponding time-frequency diagram 1100 illustrating scanning filter adjustment for the example of FIG. 10.

In the example of FIG. 10 a type 1 radar signal is considered with carrier frequency $f_c$+30 and an 80 MHz co-channel interference. The parameters N=3 and M=1 are applied. In this particular case, PRI>S/q, which means that the 1 PRI&PW module 702 will not be able to detect two consecutive pulses with legal PRI in a single scanning filter frequency hop. However, the M PW detector 703 estimates the PW of the detected pulse and sends an estimated PRI to the N PRI&PW detector module 701 and the adaptive scanning algorithm. In this case, the radar signal type is predicted to be type 1 and the estimated PRI is set to approximately 3 ms. The first detected pulse 1014 arrives in between 3 ms and 4 ms. Using the estimated PRI 1013, the next pulse is expected in the time interval 6 ms to 7 ms. However, the second pulse is detected in the time interval 4 ms to 5 ms. Since these two consecutive pulses have same PW and a legal PRI, the PRI estimate is updated 1012 and using this estimate detection is triggered 1015 as explained above with respect to FIG. 7.

After the first two detected pulses, one can observe that the following pulse 1011 is overlapped with WiFi signal and thus excluded from the detection process. However, the N PRI&PW 701 carries on 1016 until the next pulse arrives, which is then detected 1015.

FIG. 11 illustrates the 80 MHz operating channel (radio channel) in which an exemplary number of four subbands are scanned by the scanning filter. The same parameters apply as described above with respect to FIG. 9.

Using this novel approach, detection rates of 89%, 96.5%, 98% and 94.5% were obtained for radar signal types 1-4 respectively. An 80 MHz operating channel and a 20 MHz co-channel interferer with a channel load of 20% was considered. In a similar set up but with an 80 MHz co-channel interference, detection rates of 87.5%, 95%, 95.5% and 94% were obtained for types 1-4 respectively. In addition, a 0% probability of false detection was obtained for all previous cases considered. All these results are in compliance with the FCC 06-96

The devices and systems described in this disclosure may be implemented as Digital Signal Processors (DSP), microcontrollers or any other side-processor or hardware circuit on a chip or an application specific integrated circuit (ASIC).

Embodiments described in this disclosure can be implemented in digital electronic circuitry, or in computer hardware, firmware, software, or in combinations thereof, e.g. in available hardware of mobile devices or in new hardware dedicated for processing the methods described herein.

The present disclosure also supports a computer program product including computer executable code or computer executable instructions that, when executed, causes at least one computer to execute the performing and computing blocks described herein, in particular the method 300 described above with respect to FIG. 3 and the computing blocks described above with respect to FIGS. 4 to 7. Such a computer program product may include a readable storage medium storing program code thereon for use by a processor, the program code comprising instructions for performing the method 300 or the computing blocks as described above.

EXAMPLES

The following examples pertain to further embodiments. Example 1 is a method for radar signal detection, the method comprising: scanning a radio channel by a scanning filter in a first frequency subband to provide an incoming signal; detecting a potential radar signal in the incoming signal based on prior knowledge of a structure of the radar signal; and if the potential radar signal is detected, keeping the scanning filter in the first frequency subband; if no potential radar signal is detected, adjusting the scanning filter to a second frequency subband.

In Example 2, the subject matter of Example 1 can optionally include that the structure of the radar signal is defined according to the Federal Communications Commission (FCC) dynamic frequency selection (DFS) standard FCC 06-96.

In Example 3, the subject matter of Example 2 can optionally include that the radar signal is from the category of short pulse radar test waveforms according to the definition of FCC 06-96.

In Example 4, the subject matter of Example 3 can optionally include that the radar signal is from one of four types of short pulse radar test waveforms according to FCC 06-96.

In Example 5, the subject matter of any one of Examples 1-4 can optionally include that the radar signal comprises a constant pulse width (PW) and pulse repetition interval (PRI) per burst.

In Example 6, the subject matter of Example 5 can optionally include that the pulse width is in a range from about 1 microseconds to about 20 microseconds and the pulse repetition interval is in a range from 150 microseconds to 3066 microseconds.

In Example 7, the subject matter of any one of Examples 1-6 can optionally include: passing the incoming signal through an envelope detector to provide an envelope signal, wherein an integration time of the envelope detector is adjusted based on a type of the radar signal.

In Example 8, the subject matter of Example 7 can optionally include: applying a threshold to the envelope signal to provide a threshold signal, wherein the threshold is based on the type of the radar signal.

In Example 9, the subject matter of Example 8 can optionally include: providing a detection decision and an estimate of a pulse repetition interval of the radar signal based on the threshold signal.

In Example 10, the subject matter of Example 9 can optionally include that the detection decision and the estimate of the pulse repetition interval are based on the type of radar signal.

In Example 11, the subject matter of Example 10 can optionally include: providing the detection decision and the estimate of the pulse repetition interval for each type of the radar signal.

In Example 12, the subject matter of any one of Examples 9-11 can optionally include: if the detection decision indicates a presence of a potential radar signal, determining a scanning time interval for keeping the scanning filter in the first frequency subband.

In Example 13, the subject matter of Example 12 can optionally include that the scanning time interval is based on a maximum decision with respect to pulse repetition intervals of each type of radar signal.

In Example 14, the subject matter of Example 13 can optionally include that the scanning time interval is further based on a bandwidth of the scanning filter, a bandwidth of the radio channel and a scanning period.

Example 16 is a radar signal detection device, comprising: a scanning filter configured to scan a radio channel in an adjustable frequency range to provide an incoming signal; a radar signal detector configured to detect a potential radar signal in the incoming signal and to determine a pulse repetition interval (PRI) of the potential radar signal based on prior knowledge of a structure of the radar signal; and a controller configured to adjust the frequency range of the scanning filter based on the determined PRI of the potential radar signal.

In Example 16, the subject matter of Example 15 can optionally include that the radar signal detector comprises a plurality of envelope detectors, each one associated to a specific type of radar signal.

In Example 17, the subject matter of Example 16 can optionally include that each envelope detector is configured to provide a respective envelope signal based on integration of the incoming signal using an integration time adjusted based on the specific type of radar signal.

In Example 18, the subject matter of Example 17 can optionally include that the radar signal detector comprises a plurality of type detectors, each type detector configured to provide a detection decision and a PRI for the specific type of radar signal.

In Example 19, the subject matter of Example 18 can optionally include that the controller is configured to adjust the frequency range of the scanning filter based on a maximum decision with respect to the PRIs determined by the type detection.

In Example 20, the subject matter of any one of Examples 18-19 can optionally include that each type detector comprises: a first detector configured to detect a presence of a plurality of short pulses having a pulse width (PW) below a predefined PW; a second detector configured to detect a presence of a first plurality of consecutive pulses with the same PW; a third detector configured to detect a presence of a second plurality of consecutive short pulses with the same PW and the same PRI; and a fourth detector configured to detect a presence of a plurality of long pulses having a PW above the predefined PW.

In Example 21, the subject matter of Example 20 can optionally include that the fourth detector is configured to provide the detection decision based on detection results of the first detector, the second detector and the third detector.

Example 22 is a radar signal detector, comprising: a first detector (1 PRI&PW) configured to detect a plurality of pulses of the same pulse width (PW) based on a threshold signal and to estimate a pulse repetition interval (PRI) of the detected pulses; a second detector (M PW) configured to detect a plurality of consecutive pulses of the same PW based on the threshold signal and to estimate a PRI of the detected pulses; and a third detector (N PRI&PW) configured to detect a plurality of consecutive pulses of the same PW and the same PRI based on the threshold signal.

In Example 23, the subject matter of Example 22 can optionally include that the third detector is further configured to predict an arrival of new pulses based on the PRIs estimated by the first detector and the second detector.

In Example 24, the subject matter of any one of Examples 22-23 can optionally include a fourth detector configured to detect a presence of a plurality of long pulses having a PW above a predefined PW.

In Example 25, the subject matter of Example 24 can optionally include that the third detector is configured to detect an overlap of the plurality of pulses detected by the third detector with the long pulses, and that the third detector is configured to trigger a radar signal detection decision if the plurality of pulses detected by the third detector are detected without an overlap with the long pulses.

Example 26 is a computer readable non-transitory medium on which computer instructions are stored which when executed by a computer causes the computer to perform the method of any one of Examples 1 to 14.

Example 27 is a device for radar signal detection, the device comprising: means for scanning a radio channel by a scanning filter in a first frequency subband to provide an incoming signal; means for detecting a potential radar signal in the incoming signal based on prior knowledge of a structure of the radar signal; and if the potential radar signal is detected, means for keeping the scanning filter in the first frequency subband, if no potential radar signal is detected, means for adjusting the scanning filter to a second frequency subband.

In Example 28, the subject matter of Example 27 can optionally include: means for passing the incoming signal (x(n)) through an envelope detector to provide an envelope signal, wherein an integration time of the envelope detector is adjusted based on a type of radar signal.

In Example 29, the subject matter of Example 28 can optionally include means for applying a threshold to the envelope signal to provide a threshold signal, wherein the threshold is based on the type of radar signal.

In Example 30, the subject matter of Example 29 can optionally include means for providing a detection decision and an estimate of a pulse repetition interval of the radar signal based on the threshold signal.

Example 31 is a system-on-chip, comprising: a scanning filter subsystem configured to scan a radio channel in an adjustable frequency range to provide an incoming signal; a radar signal detection subsystem configured to detect a potential radar signal in the incoming signal and to determine a pulse repetition interval (PRI) of the potential radar signal based on prior knowledge of a structure of the radar signal; and a controlling subsystem configured to adjust the frequency range of the scanning filter subsystem based on the determined PRI of the potential radar signal.

In Example 32, the subject matter of Example 31 can optionally include that the radar signal detection subsystem comprises a plurality of envelope detectors, each one associated to a specific type of the radar signal.

Example 33 is a mobile device, comprising: a scanning filter configured to scan a radio channel in an adjustable frequency range to provide an incoming signal; a radar signal detector configured to detect a potential radar signal in the incoming signal and to determine a pulse repetition interval (PRI) of the potential radar signal based on prior knowledge of a structure of the radar signal; and a controller configured to adjust the frequency range of the scanning filter based on the determined PRI of the potential radar signal.

In Example 34, the subject matter of Example 33 can optionally include that the radar signal detector comprises a plurality of envelope detectors, each one associated to a specific type of radar signal.

In Example 35, the subject matter of any one of Examples 33-34 can optionally include that the mobile device is configured to operate in Unlicensed National Information Infrastructure (U-NII) bands.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A method for radar signal detection, the method comprising:
scanning a radio channel by a scanning filter in a first frequency subband to provide an incoming signal;
passing the incoming signal through an envelope detector to provide an envelope signal, an integration time of the envelope detector being adjusted based on a type of the radar signal;
applying a threshold to the envelope signal to provide a threshold signal, the threshold being based on the type of the radar signal;
detecting a potential radar signal in the incoming signal using the threshold signal based on prior knowledge of a structure of the radar signal;
if the potential radar signal is detected, keeping the scanning filter in the first frequency subband; and
if no potential radar signal is detected, adjusting the scanning filter to a second frequency subband.

2. The method of claim 1, wherein the structure of the radar signal is defined according to the Federal Communications Commission (FCC) dynamic frequency selection (DFS) standard FCC 06-96.

3. The method of claim 2, wherein the radar signal is from the category of short pulse radar test waveforms according to the definition of FCC 06-96.

4. The method of claim 3, wherein the radar signal is from one of four types of short pulse radar test waveforms according to FCC 06-96.

5. The method of claim 1, wherein the radar signal comprises a constant pulse width (PW) and PRI per burst.

6. The method of claim 5, wherein the pulse width is in a range from 1 microseconds to 20 microseconds and the PRI is in a range from 150 microseconds to 3066 microseconds.

7. The method of claim 1, comprising:
providing a detection decision and an estimate of the PRI of the radar signal based on the threshold signal.

8. The method of claim 7, wherein the detection decision and the estimate of PRI are based on the type of the radar signal.

9. The method of claim 8, comprising:
providing the detection decision and the estimate of the PRI for each type of the radar signal.

10. The method of claim 7, comprising:
if the detection decision indicates a presence of a potential radar signal, determining a scanning time interval for keeping the scanning filter in the first frequency subband.

11. The method of claim 10, wherein the scanning time interval is based on a maximum decision with respect to PRI of each type of radar signal.

12. The method of claim 11, wherein the scanning time interval is further based on a bandwidth of the scanning filter, a bandwidth of the radio channel, and a scanning period.

13. The method of claim 1, wherein detecting the potential radar signal in the incoming signal includes identifying the presence of consecutive pulses having the same pulse width and pulse repetition interval (PRI) based on prior knowledge of the structure of the radar signal.

14. The method of claim 1, wherein each type of the radar signal has a different structure associated with different consecutive pulses having the same pulse width and different PRIs, and
wherein the act of detecting a potential radar signal includes identifying, by each separate detector from among a plurality of detectors, the presence of consecutive pulses having the same pulse width and the same PRI in accordance with each type of the radar signal.

15. The method of claim 14, further comprising:
determining, by each separate detector from among the plurality of detectors, a PRI associated with each respectively detected radar signal.

16. The method of claim 15, further comprising:
determining a maximum PRI from among the PRIs determined by each separate detector from among the plurality of detectors, and
wherein if the detection decision indicates a presence of a potential radar signal, determining a scanning time interval for keeping the scanning filter in the first frequency subband based upon the type of the radar signal associated with the detector from among the plurality of detectors that generated the maximum PRI.

17. The method of claim 14, further comprising:
determining a maximum PRI from among the PRIs determined by each separate detector from among the plurality of detectors, and
wherein the act of adjusting the scanning filter to the second frequency subband is based upon the maximum PRI.

18. The method of claim 1, wherein detecting the potential radar signal in the incoming signal includes (i) estimating a PRI based upon a first detection of consecutive pulses within the incoming signal at the first frequency subband, and (ii) determining that a second, subsequent detection of consecutive pulses having the same pulse width as those associated with the first detection arrive at a time corresponding to the estimated PRI.

19. The method of claim 1, wherein detecting the potential radar signal in the incoming signal includes excluding a detection of a potential radar signal in the incoming signal when the presence of consecutive pulses having the same pulse width and PRI overlaps with one or more pulses associated with the incoming signal.

20. The method of claim 19, wherein the incoming signal is a Wi-Fi signal.

* * * * *